(12) United States Patent
Zupan

(10) Patent No.: US 12,070,724 B2
(45) Date of Patent: Aug. 27, 2024

(54) METHOD AND DEVICE FOR REMOVING PARTICLES FROM WASTE WATER

(71) Applicant: Planet Care, Resitve Za Okolje D.O.O., Ljubljana (SI)

(72) Inventor: Mojca Zupan, Ljubljana (SI)

(73) Assignee: Planet Care, Resitve Za Okolje D.O.O., Ljubljana (SI)

( * ) Notice: Subject to any disclaimer, the term of this patent is extended or adjusted under 35 U.S.C. 154(b) by 64 days.

(21) Appl. No.: 16/631,951

(22) PCT Filed: Jul. 19, 2018

(86) PCT No.: PCT/SI2018/050024
§ 371 (c)(1),
(2) Date: Jan. 17, 2020

(87) PCT Pub. No.: WO2019/017850
PCT Pub. Date: Jan. 24, 2019

(65) Prior Publication Data
US 2020/0179846 A1 Jun. 11, 2020

(30) Foreign Application Priority Data
Jul. 20, 2017 (WO) ................. PCT/SI2017/000019

(51) Int. Cl.
*B01D 65/02* (2006.01)
*B01D 27/02* (2006.01)
(Continued)

(52) U.S. Cl.
CPC ............. *B01D 65/02* (2013.01); *B01D 27/02* (2013.01); *B01D 27/06* (2013.01); *B01D 27/148* (2013.01);
(Continued)

(58) Field of Classification Search
CPC ........ B01D 65/02; B01D 27/02; B01D 27/06; B01D 35/02; B01D 36/02; B01D 61/147; B01D 63/06; D06F 39/10
See application file for complete search history.

(56) References Cited

U.S. PATENT DOCUMENTS 4,069,026 A * 1/1978 Simm ................ B01D 39/1623
264/413
2004/0245166 A1* 12/2004 Rice ........................ C02F 3/103
210/435
(Continued)

FOREIGN PATENT DOCUMENTS

CA 1092517 A * 12/1980 ........... B01D 29/925
CN 103813843 A * 5/2014 ............. B01D 65/02
(Continued)

OTHER PUBLICATIONS

Machine Translation of WO2013079348, Eglmeier, published 2013, 41 total pages. (Year: 2013).*
(Continued)

*Primary Examiner* — Jonathan M Peo
(74) *Attorney, Agent, or Firm* — Robert G. Lev

(57) ABSTRACT

A filter system configured to remove microfibers released from textiles being processed in a fluid. This fluid is sent into a filter housing containing a filter cartridge which in turn contains a movable inner filter. The movable inner filter is sufficiently flexible as to permit random movement in the fluid so that the inner filter rubs against the cartridge housing thereby removing particulate matter from the cartridge housing, thereby extending the useful life of the filter cartridge.

8 Claims, 8 Drawing Sheets

(51) Int. Cl.
  *B01D 27/06* (2006.01)
  *B01D 27/14* (2006.01)
  *B01D 35/02* (2006.01)
  *B01D 36/02* (2006.01)
  *B01D 61/14* (2006.01)
  *B01D 63/06* (2006.01)
  *D06F 39/10* (2006.01)

(52) U.S. Cl.
  CPC ............ *B01D 35/02* (2013.01); *B01D 36/02* (2013.01); *B01D 61/147* (2013.01); *B01D 63/06* (2013.01); *D06F 39/10* (2013.01); *B01D 2201/08* (2013.01); *B01D 2221/02* (2013.01); *B01D 2311/2649* (2013.01)

(56) References Cited

U.S. PATENT DOCUMENTS

| | | | | |
|---|---|---|---|---|
| 2011/0220586 A1* | 9/2011 | Levitt | ................... | B01D 29/23 210/791 |
| 2012/0137885 A1* | 6/2012 | Dullaert | ................... | D01F 6/90 427/244 |
| 2013/0104606 A1* | 5/2013 | So | ................... | B01D 37/00 210/323.1 |
| 2018/0290082 A1* | 10/2018 | Koski | ................... | B01D 33/11 |

FOREIGN PATENT DOCUMENTS

| | | | |
|---|---|---|---|
| DE | 4305547 | 8/1994 | |
| DE | 4305547 A1 * | 8/1994 | ............. D04B 15/14 |
| EP | 0582286 | 2/1994 | |
| EP | 0582286 A1 * | 2/1994 | ............. A62B 23/02 |
| WO | WO 2003/041847 | 5/2003 | |
| WO | WO-03041847 A1 * | 5/2003 | ........... B01D 63/025 |

OTHER PUBLICATIONS

"Machine Translation of EP0747136", Hausmann, published 1996, 21 total pages. (Year: 1996).*

* cited by examiner

METHOD AND DEVICE FOR REMOVING PARTICLES FROM WASTE WATER

PRIORITY INFORMATION

The present application is a National Stage Entry of PCT/SI2018/050024, filed on Jul. 19, 2018, and claims priority from PCT App. No: PCT/SI2017/000019, filed on Jul. 20, 2017.

FIELD OF THE INVENTION

Water filtration; waste water filtration; fibre removal; microfibre removal

DESCRIPTION OF BACKGROUND ART

Technical problem solved by the presented invention is efficient removal of fibres and clogging of filtration pores in filters for waste water filtration, or any other fluid, which includes particles, especially fine particles, preferably microfibres. Due to large amounts of microfibres in waste water, especially waste water from washing machines, filters get rapidly clogged and must be purified or replaced, which is cost and time consuming and often a disruption for the process. During the wet cleaning of the filtration system, a large amount of the fibres is reentered into waste water.

Water filtration is a very wide concept. The process and structure have changed a great amount over the last 50 years. To understand the ability in one and lack of ability in other filtration systems we should first understand the difference between different processes and filtrations.

Known methods and devices for filtration of fluids including waste water are not specifically intended to stop fibres. They stop fibres that are larger than the pores in the present filtration medium. Fibres are characterized by high aspect ratios—the ratio between fibre thickness and fibre length, which are unlike those of other particles being filtered. The high aspect ratio of fibres makes efficient filtering of fibres by known methods subject to low retention rates or rapid clogging of the filtering medium. That is why such filters must have excess capacity, be cleaned or replaced often due to lack of a self-cleaning functionality. The low efficiency of fibre retention or fibres lost and reintroduced into water through manual cleaning can reduce the overall efficiency of filtration. The retained fibres must be disposed appropriately.

Installing the filter into washing machines contributes to resolving the issue of pollution of the environment with microfibres. Washing machines expel fibres and microfibres that are shed from clothes and textiles during washing and drying. The expelled microfibres enter into the sewage system and into interim sewage treatment plants, if existing. Ineffective filtration causes over 40% of microfibres to pass through municipal sewage treatment plants and into the environment. Fibres made of artificial polymer materials adsorb heavy metals and other contaminants including persistant organic pollutants. Creatures living in the sea, lakes and rivers mistake contaminant infused fibres for food and the fibres make their way into the food chain, posing an increasing threat to all life. The fibres may influence the organisms either physically or through the effects of constituent and adsorbed chemicals they pose a significant environmental threat to future generations. On average 100,000 people cause approximately 20 tons of microfibres to be washed away into sewers each day.

There are different filtration systems for removing impurities from washing machine waste water on the market. One of the known solutions to the above technical problem is shown in the patent document no. U.S. Pat. No. 4,906,367 A. It concerns a patent for a device for filtering impurities from washing machine waste water pipes. The filter has a flexible textile mesh that is open on one side and closed on the other. A polymer ring is affixed to the mesh for it to be connected to the drain pipe of the washing machine. This allows the filter to catch impurities that exit the washing machine with waste water. The solution is applicable only to washing machines with drain pipes exiting directly into a bathtub. When the filter becomes clogged by impurities it is physically removed and cleaned. It is primarily intended for protecting sewage pipes in the building. Such a design does not allow for the removal of micro fibres. The issue is that the design operates on the principle of a sieve and uses larger pores to increase permeability, but such pores cannot hold microfibres. Use of a net with smaller pores would cause the filter to clog in a very short time.

Document number U.S. Pat. No. 4,217,667 A constitutes a separator and drain waste filter. A separator and filter of exhaust waste is a device that prevents the exhaust openings of a washing machine with waste and solid particles. The filtering device is a frustro-conical mesh filter that is divided into two parts. The upper section of the filter serves as an overflow opening while the bottom half is used to attach the device to a drain. The filter is placed onto the drain of a bathtub where it physically prevents the flow of solid particles from the washing machine and potentially prevents the clogging of the sewage pipe. The solution is applicable only to washing machines with drain pipes exiting directly into a bathtub. The filter has a coarse mesh that does not retain micro particles or fine fibres that are created by the washing of synthetic clothing.

WO2013079348 discloses a device and method to remove particles from waste water, the device comprising a filter housing and a filter element. Said housing/container comprises an inlet and an outlet permeable for water. The filter element can move within the housing as a result of the flow, and this also results in cleaning of the filter. The container is cylindrical and a pump is placed to provide pressure A known solution under patent no. U.S. Pat. No. 7,073,520 refers to a filter that is installed into a washing machine and uses its labyrinth structure to catch major foreign objects and particles that could potentially damage the motor of the washing machine pump. The filter is installed before the drain pump. The filter must be cleaned after a certain amount of waste accumulates inside. This type of filter does not remove microfibres and is intended primarily for the protection of the drain pump by capturing pieces such as buttons and coins.

A high purity of water can be achieved through ultrafiltration. Although ultrafiltration achieves excellent water quality, the method has certain shortcomings due to the method of operation. Ultrafiltration is a process that operates based on low pressure. Low pressure allows for pathogens and solid suspensions to be removed from water. In purification of drinking water ultrafiltration allows for a high quality of exiting water. There are many types of ultrafiltration membranes that are made of different materials.

A common problem of these membranes is that they act as a molecular sieve and therefore rapidly become clogged. Assuring effective operation of such systems requires the use of chemical agents.

We know the following ultrafiltration membranes: cellulose acetate (CA), polysulfone (PS), polyvinylidene fluoride (PVDF), polyethersulfone (PES), polypropylene (PP), polyvinyl chloride (PVC), polyacrylonitrile (PAN) and polyamide (PA).

All these membranes have pores that water can permeate through hygroscopically. Permeability is measured in MWCO—Molecular Weight Cut-Off. All these membranes have a common problem—clogging that leads to reduced flow rates. Membranes clog due to the presence of inorganic and organic particles in water that collect on the surface and pores of the membrane and gradually reduce its permeability.

Gradual clogging reduces flow until the membrane is no longer permeable. To reduce clogging, the membrane must be chemically cleaned. Chemical cleaning of polymer ultrafiltration membranes that contributes to minimal loss of water flow despite irreversible clogging. Choosing a method for cleaning polymer membranes depends on membrane material, its chemical and physical resilience and propensity for clogging. The driving force of the method is the pressure differential caused by the density of the volumetric flux of permeate through the membrane. Ultrafiltration separates substances due to differences in particle size. Retention of particles with a molecular weight between 1,000 and 20,000 g/mol rapidly leads to irreversible clogging of the membrane and consequent destruction of the filter.

SUMMARY OF THE INVENTION

The present invention is a filter system configured to remove impurities including textile particles and microfibers released from textiles being processed in a fluid. The filter system includes a filter housing having a fluid inlet and a fluid exit. The filter housing also includes access for placing and removing a filter cartridge into from the filter housing. The filter cartridge includes a removable cartridge housing with at least one wall being permeable to the liquid. The filter cartridge also includes at least one first filter membrane constituting at least a portion of at least one wall of the cartridge housing. The cartridge input port is arranged to direct the fluid to the cartridge housing. There is also at least one movable inner filter, removably arranged within the interior of the cartridge housing and positioned to receive the fluid from the cartridge input port. The movable inner filter is moved by the incoming fluid. The movable inner filter includes a plurality of freely movable surfaces selected from the group consisting of bands, ribbons, tapes, floccules, strings, sheets, crumpled sheets and discs. The freely movable elongated surfaces are arranged to brush against at least one of the wall, thereby removing and retaining the impurities from that impermeable wall.

DETAILED DESCRIPTION OF THE INVENTION

Figure 1:
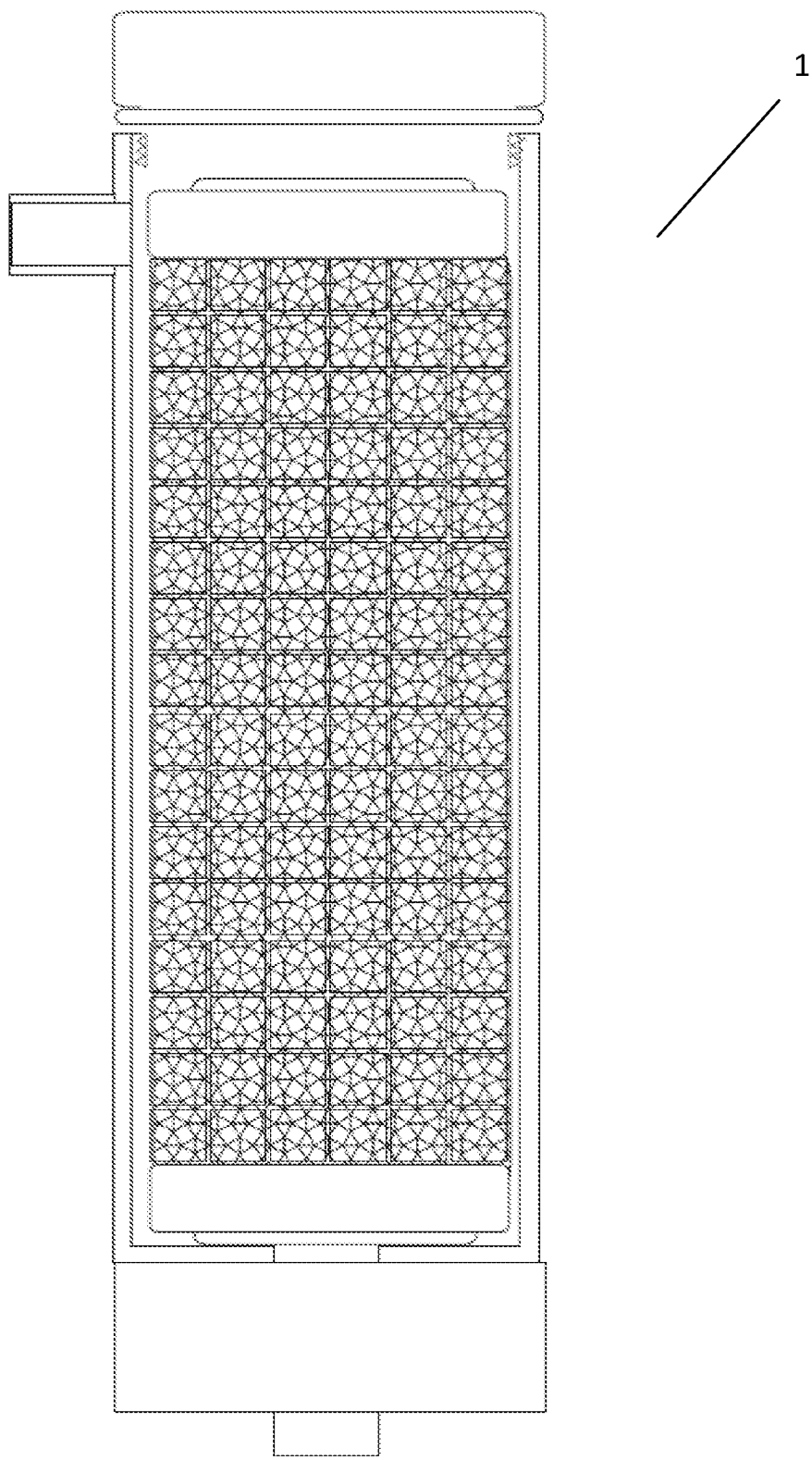
FIG. 1 is a side interior view depicting multiple elements of the assembled filter.
Figure 2:
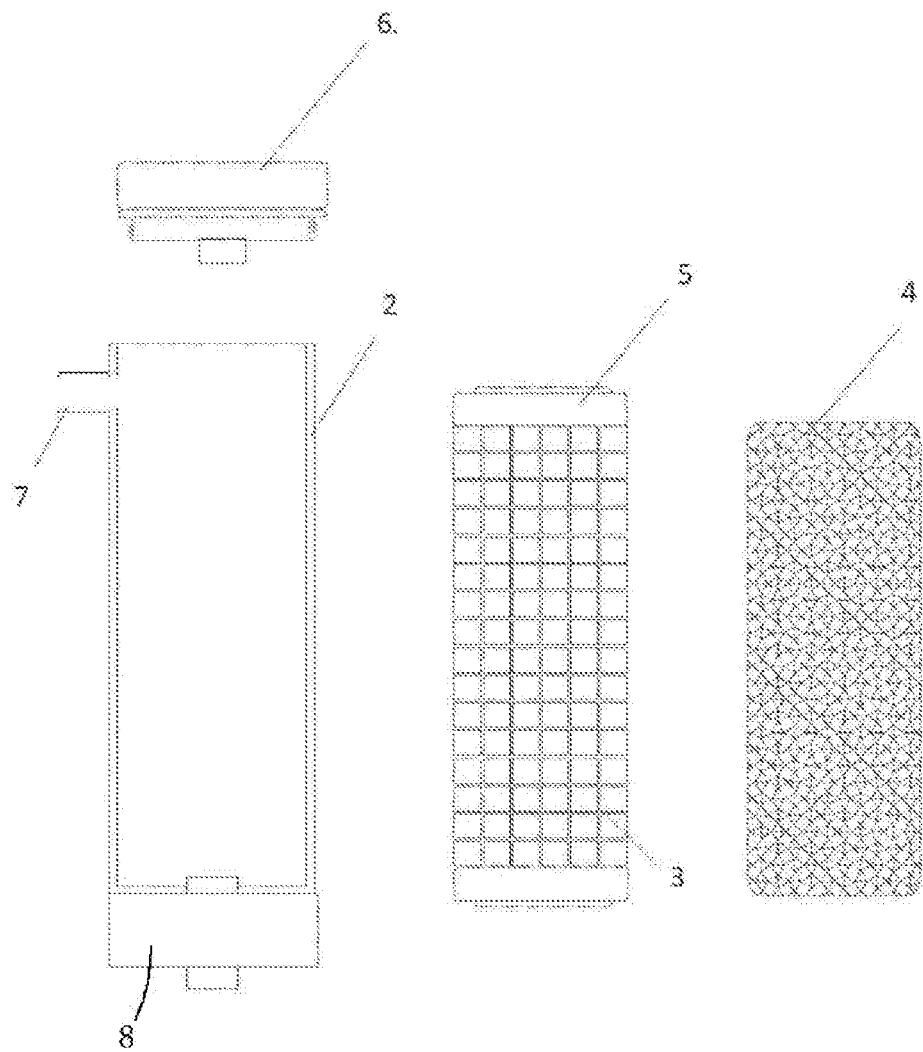
FIG. 2 is a side interior expanded view depicting side views of components of the filter.
Figure 3:
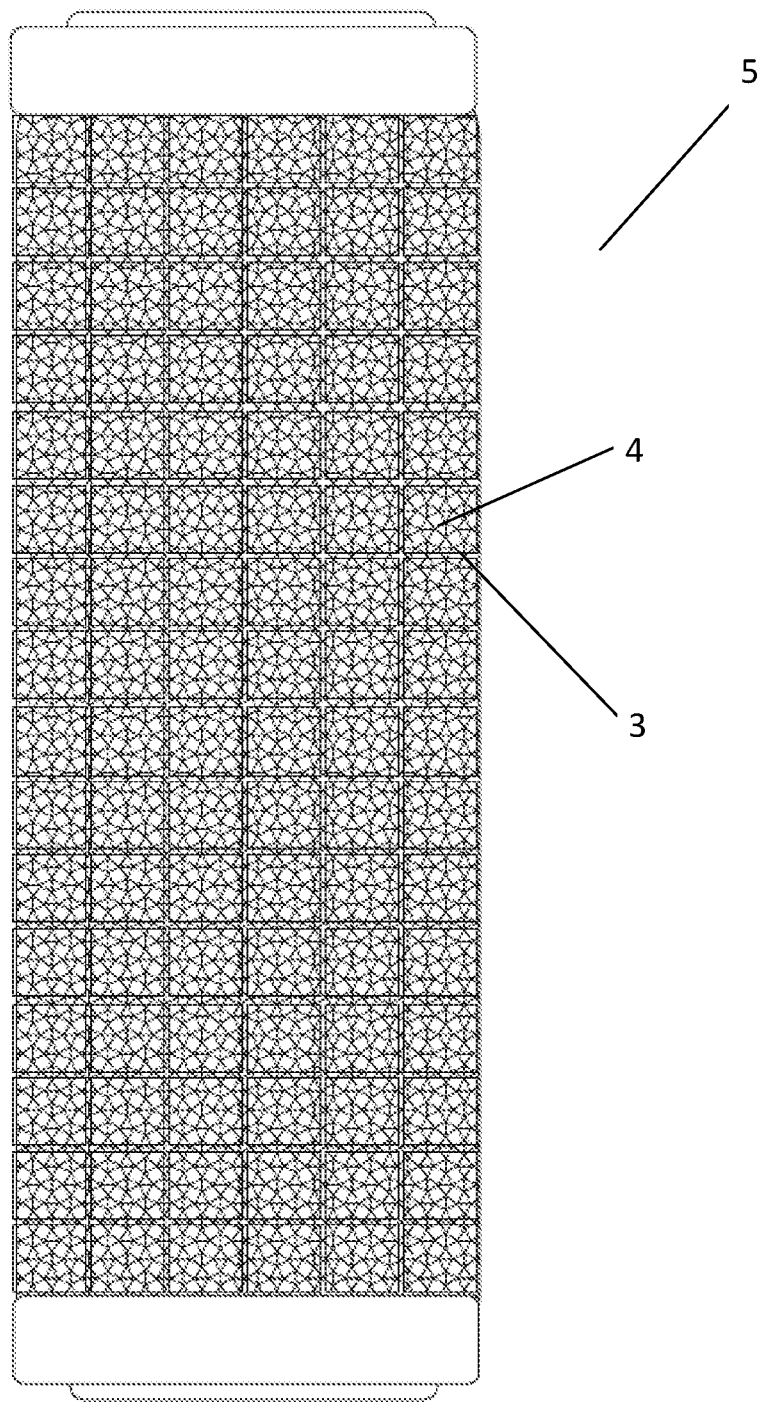
FIG. 3 is a side detailed view depicting the filter membrane.
Figure 4:
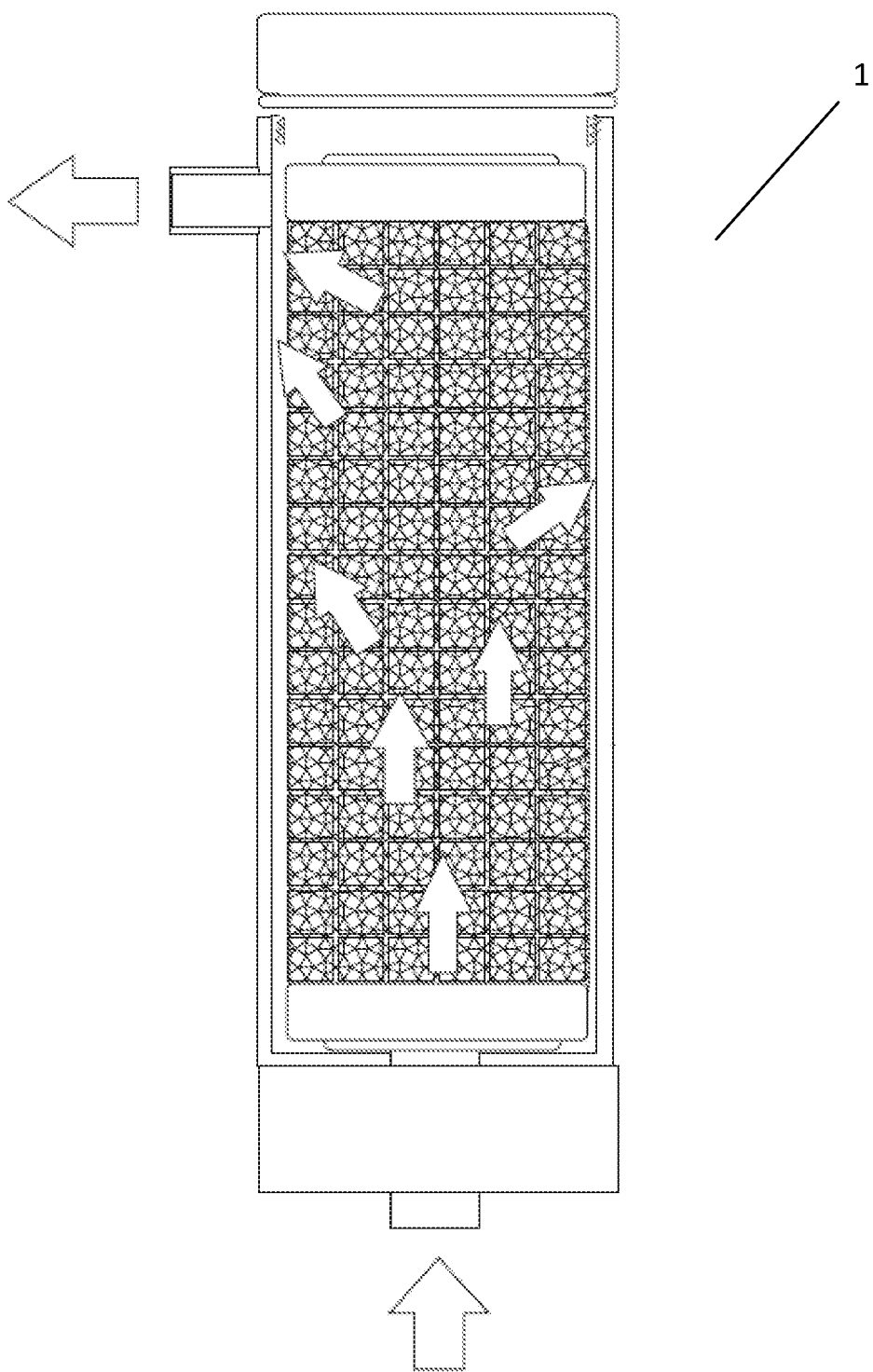
FIG. 4 is a side view depicting the flow of fluid through the filter.

The inventive filter and method for filtering solve above referenced problem of filtering of microfibres. The filter is specifically designed for efficient removal of microfibres from fluids including wastewater such as is emitted by washing machines and clothes dryers in their normal mode of operation. The filter and filtering method hereby disclosed is characterized by the possibility to insert the filtering device directly into existing washing machines without the need for modifications. The filter has a form that allows its direct insertion into an existing void in the washing machine that is connected or an integral part of the drain pump. The filter reaches high efficiency due to the use of specific filtering media which may consist of a combination of two or more filter media, which may include a filter membrane incorporated, at least partially, in the wall of the filter cartridge, and an internal filter which can be either a moveable filtering medium which is inserted into the filter cartridge. The filtering medium may consist of a graduated filter, preferably on graduated filter base or a filter consisting of a number of layers. Parts of the filtering medium can remain freely movable within the filter cartridge thus providing a degree of self-cleaning function that extends the useful time of the filter. The filter can have homogeneous permeability or it can be graduated with inhomogeneous permeability perpendicularly to the filter thickness.

Filter in this specification refers to a filter system used for filtering in accordance with this invention.

Filter according to this invention is comprised of a filter housing, a filter cartridge comprising at least one wall, said wall at least partially comprising at least one filter membrane. Said filter cartridge further comprises at least one inner filter such as moveable inner filter which is inserted into filter cartridge and is comprised of a filter filler such, for example, felt, wool, or other form of filtering material, and is separate from filter membrane, or other form of internal filter such as graduated filter, preferably on graduated filter base, or filter, preferably on filter base., said base referring to constructional feature used to give said filter essentially stable form.

For purposes of this specification graduated filter is a filter providing for gradual increase in removal of particles in a particular direction, or by providing different permeability and/or removal rating in different directions. Example of graduated filter is a filter wherein the outermost layer that is in contact with incoming wastewater of said filter is course, to be finer and finer until finest towards the side where the water flows from the filter. The concept of outermost is, of course, only a concept. This could mean one dimensional graduated filter wherein said one dimension is single Cartesian coordinate dimension (e.g. depth), single cylindrical coordinate dimension (e.g. radius) or single spherical coordinate dimension (e.g. radius, again). This could also mean three-dimensional filter with outermost and innermost defined by pressure gradient of the flow flowing through said filter. In other words, example of graduated filter is a filter wherein the outermost layer of the filter is course, while the next layers are progressively finer. The graduate filter can also mean a three dimensional filter with inhomogeneous permeability caused by pressure gradient causing the water flow flowing through the filter. The inner filter can be fixed on a filter base, which represents a constructional feature onto which the inner filter is arranged. Example of such construction and graduated filter with graduated filter base is shown attached Figures.

For purposes of this specification filter base represents a constructional feature onto which said filter is arranged. Example of such a construction is presented in Figures, below. Same is true for graduated filter with graduated filter base.

Both filter elements, namely filter membrane and inner filter serve for filtering water containing impurities such as particles. These particles may include textile particles, microfibre, and any other impurities found in waste water of washing machines, or other machines for washing and drying machines.

In preferred embodiment said filter according to this invention is inserted into a receptacle in said washing machine or other machine for washing, said receptacle not forming part of this invention but being part of washing machine or other machine in need for filtering of wastewater comprising microfibre.

In this description, fluid which is cleaned, is water. However, this filter and method are not limited to water. Any fluid such as for example engine oil for lubricating an engine or parts of engine, air for drying in clothes drying, cement drying, meat drying, air used for heating, ventilation, and air conditioning purposes, oil for cooking in commercial food processing installations, gas for medicine supplying and many others. So, using of word water below is not limiting, it serves in a way of example and in a way of preferred embodiment.

In addition, said moveable inner filter can optionally treated by surface modification coatings such as hydrophobic or hydrophilic coatings, bactericidal or bacteriostatic coatings and coatings that may modify the surface morphology of the filtering medium.

In addition, said moveable inner filter can optionally be electrically charged.

The operation of this invention can best be seen through description of preferred embodiment.

In preferred embodiment the filter cartridge is a hollow cylinder, preferably circular base cylinder which may be inserted into the washing machine instead of OEM filter cartridge. Waste water enters into said filter cartridge through axial opening and flows first through inner filter, said at least one inner filter selected from group containing moveable inner filter, filter, graduated filter, filter material, bulk filter material.

This inner filter in general filters out coarse particles and enables medium size particles to flow through.

However finer particles including microfibres may attach to inner filter due to characteristics of material of said inner filter, or due to its electrical charge.

The medium particles which were not retained by inner filter and were too large to be attracted to surface of said inner filter fibre or pores are stopped on said filter membrane, said filter membrane optionally forming at least part of said cartridge wall.

General filter theory teaches five mechanisms of filtration e.g. straining: the coarsest particles are entrained by filter material by being unable to pass through distance between fibres or pores of filter material.

The other four mechanisms of filtration are all related to adsorption of particles onto surface of filter material.

Inertial separation: the coarse particles are adsorbed onto the surface of filter material due to inertial effects—the particles are not able to follow meandering of the water and follow their own path therefore coming into connection with filter material.

Interception: the medium particles are able, to some degree, to follow change of momentum of the water carrying them, however, as the water accelerates between fibre or pores of filter material (convective acceleration) the pressure falls locally (as in Bernoulli equation), and particles are attracted toward surface of filter material which entrains them by adsorption.

Diffusion: the finest particles follow diffusion movement and are pushed by diffusion forces toward surface of filter material which entrains them by adsorption.

Electrostatic attraction: the particles of all sizes (except for the coarsest which have been sieved) are attracted to the surface of filter material based on weak attractive and repulsive forces based on the inherent molecular structure and properties of the filtering medium and the particles being removed from the fluid. This effect can be modified by proper treatment of the filtering medium, either physical by methods such as plasma treatment or chemically by surface modification.

For purposes of this invention, any and all kinds of filtering mechanisms can occur, in addition to already described also by means of absorption, chemical potential, surface forces, or any other means known in state of the art to retain particles on or within said filter including and not limited to said filter membrane and/or inner filter.

In this embodiment, the coarsest particle, the coarse particle, and the fine size particles tend to be filtered out by inner filter, and the medium size particles by filter membrane. This is by no means exact description or limitation of this invention but serves only as explanation why this combination is improvement over current state of the art. It can so happen that coarsest particles will be retained by said filter membrane, and medium sized particles retained by said inner filter, and same is true for all sizes of particles.

In this embodiment said filter cartridge has opening means such as cover which provides for opening of said filter cartridge and enables replacement of said inner filter and/or filter membrane through removable cover of said filter cartridge. However, the invention can also be practiced by providing for replacement filter cartridge which has been sealed, and cannot be opened without cutting (e.g. by gluing, welding or other similar methods of attaching cover to said filter cartridge), this possibility meant for quick exchange of filter cartridge. By extension, the method of factory replacement of said filter cartridges may be envisioned by which sealed and unopened filter cartridges are collected and returned to interested party such as factory or merchant, said filter cartridges opened (unsealed) at said interested party enabling recycling and/or reusing of used filter cartridges and controlled disposal of microfibre, this forming additional novel solution over existing state of the art.

This setup, however, may be prone to saturation, especially the filter membrane. It would therefore be advantageous if the invention would provide for removal of particles from the filter membrane without having to resort to removal of said filter from said receptacle or opening and cleaning of said filter cartridge.

It is for this reason that method for practicing this invention may involve programming of pump or other pressure manipulating device in order to increase and/or decrease pressure and/or change direction of flow from time to time in order to loosen at least some particles from said filter membrane, for example by invoking pressure or flow fluctuations. In such a case (during change of flow direction and/or pressure increase and/or decrease) such particles can be suspended in fluid within said filter cartridge housing. As said moveable inner filter moves, preferably freely, within said filter housing, said moveable inner filter comes into contact with said suspended particles previously retained on said filter membrane surface, and as a result, said suspended particles are contained by said moveable inner filter.

Said water flow, be it during regular operation or during said change of flow direction and/or pressure increase and/or decrease causes said moveable inner filter to move within confines of said filter cartridge housing. This movement can be free (i.e. enjoying all, or some, of degrees of freedom such as translation and/or rotation) or it can be constrained to one or more degrees of freedom. For example, said moveable inner filter can be in form of a cartridge, or cylinder, or other form which moves by help of guiding means such as rails or grooves under effect of said flow and/or pressure increase and/or decrease.

During such movements said moveable inner filter can come into contact with said filter membrane. By brushing, or grinding, or similar movement of said moveable inner filter against said filter membrane, for example, by brushing, or grinding, or similar movement of at least part of surface of said moveable inner filter against at least part of surface of said filter membrane, at least part of particles previously retained on said filter membrane by means of adsorption, electrostatic attraction, absorption, surface forces, chemical potential, or similar, is either transported from said filter membrane onto or into said moveable inner filter. For purposes of this invention this is called self-cleaning effect of said filter.

As a result of such self-cleaning, said filter membrane whose ability to pass flow of water decreased due to increased concentration of said particles on said filter membrane surface, again increases its ability to pass flow of water (or other fluid subject of cleaning and/or filtration), however, as a result, moveable inner filter becomes more saturated. Also, other forms of inner filter, i.e. graduated filter or partially moveable filter, become more saturated in time, hence requiring servicing.

After a certain period of active filtration, this increased saturation of inner filter leads to filter's reduced ability to provide filtration. At that point said filter needs servicing. The servicing according to this invention comprises one or both of the following steps:
  opening of removable cover of said filter cartridge housing, and either
  replacing of said filter cartridge, or
  opening of said filter cartridge removable lid, and replacing of said inner filter, and closing of said filter cartridge removable lid;
  replacing of said filter cartridge housing containing said filter cartridge, or combination thereof.

It should be stressed that in this case there is word "lid" used to differentiate it from "cover" but they in effect mean similar or same parts performing similar or same functions. Obviously, filter cartridge may feature removable cover (called "lid"), or it may be sealed in such a way that it can only be serviced in factory.

Obviously, effectiveness of this invention will be dependent on properties of inner filter regardless whether it is moveable inner filter, filter, partially movable inner filter, or graduated filter.

According to this invention said inner filter is comprised of at least one filter material chosen from the group consisting of the following:
  polyamide;
  polypropylene;
  polyester;
  polyaramide;
  polyacrylonitrile;
  PTFE;
  cotton;
  quartz fibre;
  paper;
  glass microfibre;
  mineral wool fibre;
  glass wool fibre;
  or combination thereof.

The material of the filter can be a polymer from the group consisting of polyamide, polyethylene, polypropylene, polyester, polyaramid, polyacrylonitrile, PTFE, or an inorganic material from the group consisting of quartz fibres, glass microfibres, mineral wool, glass wool, or a renewable biogenic material from the group consisting of wood, paper, cotton, wool, linen, or combinations thereof.

A filter described in this invention that is comprised of filtering media, defined by different pore sizes of and composition, can be composed of different materials that possess a permeable structure with physically restricted channels that allow the flow of liquids through the filter. Such materials may include organic and inorganic solid permeable materials, open-cell foamed materials, woven and nonwoven fibrous compositions and similar materials. The composition can also include natural permeable and fibrous materials.

Similar effect is obtained with homogeneous material made of nonwoven textiles, such as felt. Non homogeneity is achieved by a long path of the waste particles through thick felt, or/and with combination of two or more felts with different permeability and/or removal rating.

The filtering efficiency is influenced by the surface properties of the filtering media including submicometre structures present on natural materials that increase the retention rate of very fine textile particles and fibres.

This material can take shape of various different forms. For the purposes of this invention, shape of said material is chosen from the group consisting of:
  bands;
  ribbons;
  tapes;
  floccules;
  strings;
  sheets;
  crumpled sheets;
  disks, circular or otherwise;
  sheet pieces;
  or combination thereof.

It was also found, through method of trial and error, that shape of edge of said shapes plays important role in determining effectiveness of the inner filter, either/and by increasing ability of moveable inner filter to scrape (transport) said particles from said filter membrane onto or into said moveable inner filter, or to retain said suspended particles by said inner filter, or to retain particles following flow flowing through or past said inner filter moveable inner filter. The shape of edge of said form of said material is chosen from the group consisting of:
  zig zag shape;
  wavy shape;
  fringes;

slots;
gaps;
indentations;
or combination thereof.

Figure 5:
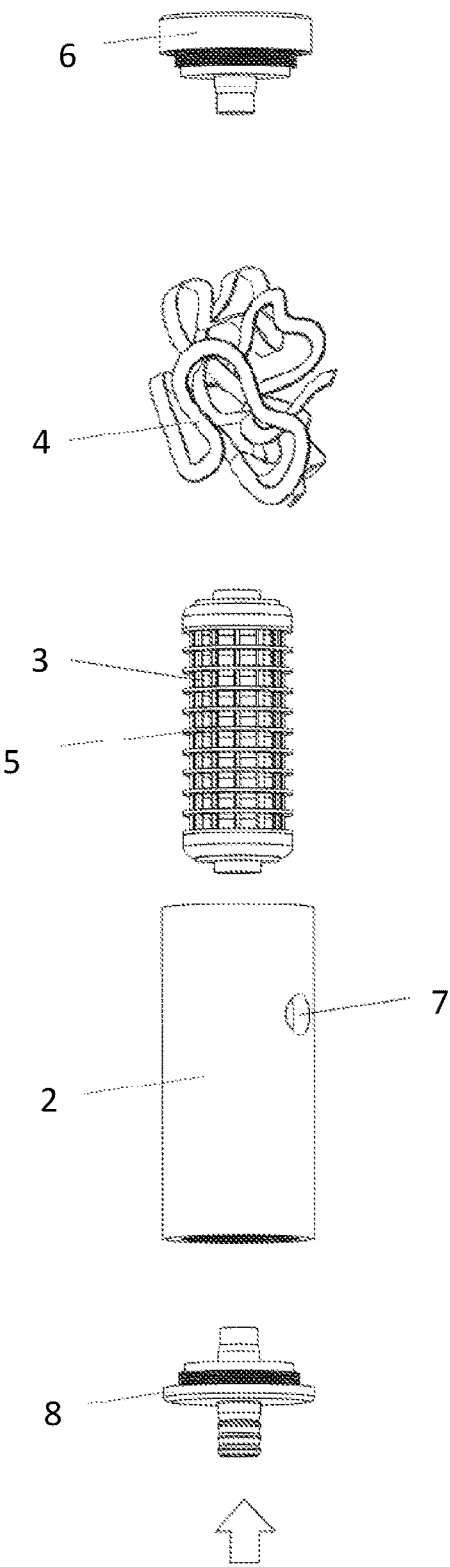
FIG. 5 is an expanded perspective view depicting various parts of the filter.

The invention is further described with help of the figures, said figures relating to preferred embodiment in non-limiting fashion, forming part of this description, and presenting:

According to preferred embodiment as shown in FIG. 5, fluid to be filtered enters through removable fluid inlet (8) into a fluid cartridge (5). Said fluid cartridge is comprised within a filter cartridge housing (2), said filter cartridge housing (2) having at least one opening for inserting and removing of said filter cartridge (5) as well as at least one opening for inlet of said fluid to be cleaned and at least one opening for exit of fluid to be cleaned.

Said filter cartridge (5) is comprised of at least one partially opened wall, said opening comprising at least one filter membrane (3). Further, said filter cartridge (5) comprises at least one moveable inner filter (4). Said filter cartridge housing (2) is closed on one side with removable fluid inlet (8) and on opposite side with removeable cover (6).

As said, said fluid to be filtered enters through removable fluid inlet (8) into said fluid cartridge (5), said fluid cartridge (5) being in fluid communication with removable fluid inlet (8). Therein, fluid meanders through or past of at least one moveable inner filter (4), which provides for at least partial filtering of fluid to be filtered. Then, this partially filtered fluid flows through at least one said filter membrane (3), which provides for additional filtering of the fluid. Then, the fluid which has been filtered by at least one said moveable filter filler (4) and said filter membrane (3) exits through at least one fluid exit (7).

During the operation, the at least one moveable filter filler (4) moves around inside of the filter cartridge (5), at least part of the time with at least part of its surface touching at least part of the surface of said filter membrane (3). Because of the motion of said moveable inner filter (4), at least part of the surface of at least one moveable inner filter (4) and at least part of the surface of said filter membrane (3) brush, grind or scrape one against another. As a result of these brushing, grinding or scraping, at least part of the particles entrained on or by said filter membrane (3) transported or transferred onto or into said at least one moveable inner filter (4) or into said fluid, which translocates them and carries them to be either re-filtered or expelled through filter membrane. For purposes of this description, said brushing, grinding or scraping of said at least part of the surface of said at least one moveable filter filler (4) against at least part of the surface of said filter membrane (3) along with mechanism of transport or transfer of said at least part of the particles entrained on or by said filter membrane (3) is called a partial self-cleaning.

Another part of self-cleaning mechanism for purposes of this invention is provided by reversing flow of fluid from time to time using stopping or reversing of a pump or a compressor, or a fan forming part of fluid delivery system, said fluid delivery system except filter described herein known in state of the art, or, by providing for pressure increase, pressure decrease or pressure fluctuation in said fluid delivery system.

Figure 6:
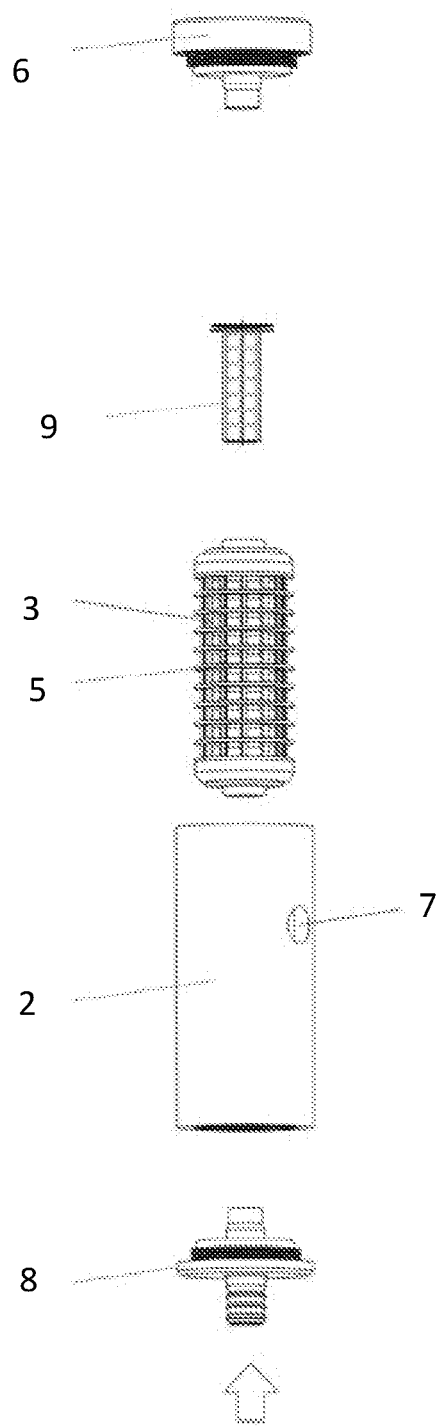
FIG. 6 is an expanded perspective view depicting a different type of inner filter.
Figure 7:
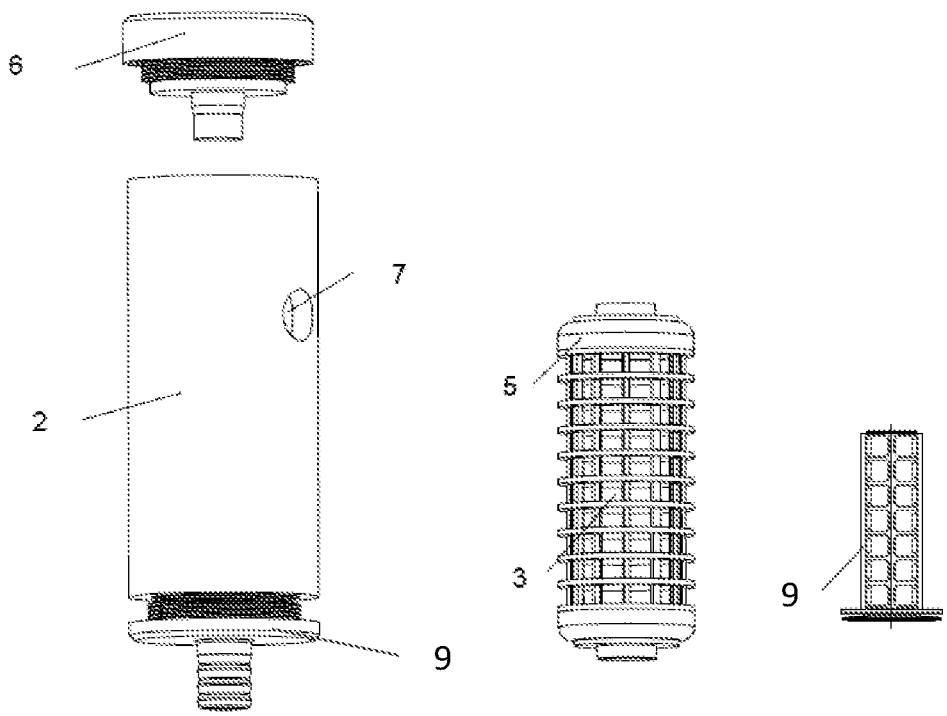
FIG. 7 is an expanded perspective view depicting three portions of one type of filter.
Figure 8:
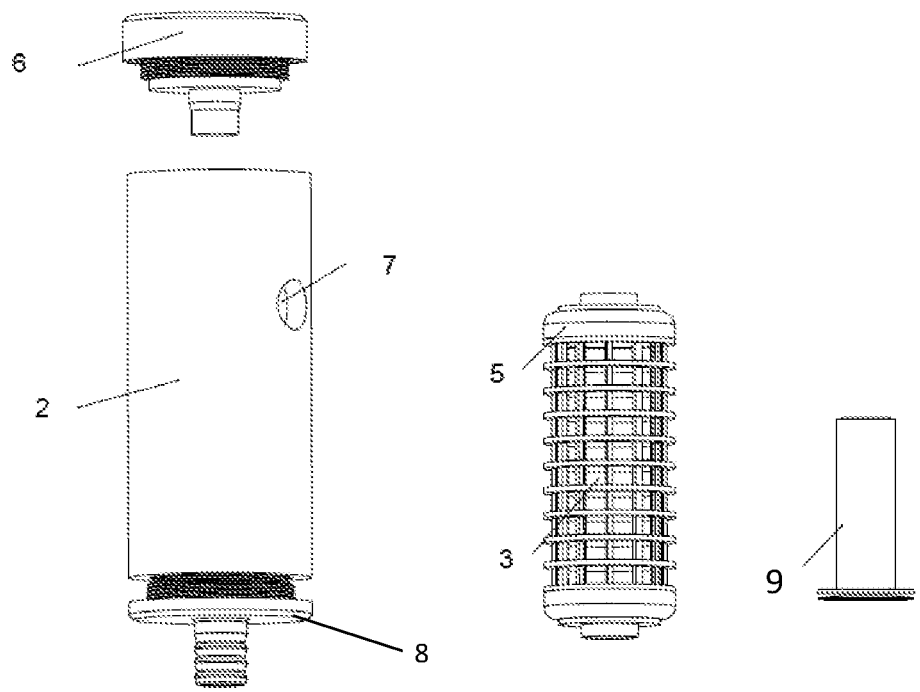
FIG. 8 is an expanded perspective view depicting another arrangement of an inner filter.

According to the second embodiment as shown in FIG. 6, fluid to be filtered enters through removable fluid inlet (8) into a fluid cartridge (5). Said fluid cartridge is comprised within a filter cartridge housing (2), said filter cartridge housing (2) having at least one opening for inserting and removing of said filter cartridge (5) as well as at least one opening for inlet of said fluid to be cleaned and at least one opening for exit of fluid to be cleaned.

Said filter cartridge (5) is comprised of at least one partially opened wall, said opening comprising at least one filter membrane (3). Further, said filter cartridge (5) comprises at least one inner filter in form of a filter or graduated filter (9). Said filter cartridge housing (2) is closed on one side with removable fluid inlet (8) and on opposite side with removable cover (6).

As said, said fluid to be filtered enters through removable fluid inlet (8) into said fluid cartridge (5), said fluid cartridge (5) being in fluid communication with removable fluid inlet (8). Therein, fluid meanders through or past said at least one inner filter in form of filter or graduated filter (9), said at least one inner filter in form of filter or graduated filter (9) providing for at least partial filtering of fluid to be filtered. Then, said fluid to be filtered which is already partially filtered by said at least one inner filter in form of filter or graduated filter (9) flows through said filter membrane (3), said filter membrane (3) providing for additional filtering of said fluid to be filtered which was already partially filtered by said at least one inner filter in form of filter or graduated filter (9). Then, the fluid which has been filtered by said at least one inner filter in form of filter or graduated filter (9) and said filter membrane (3) exits through at least one fluid exit (7).

Figure 9:
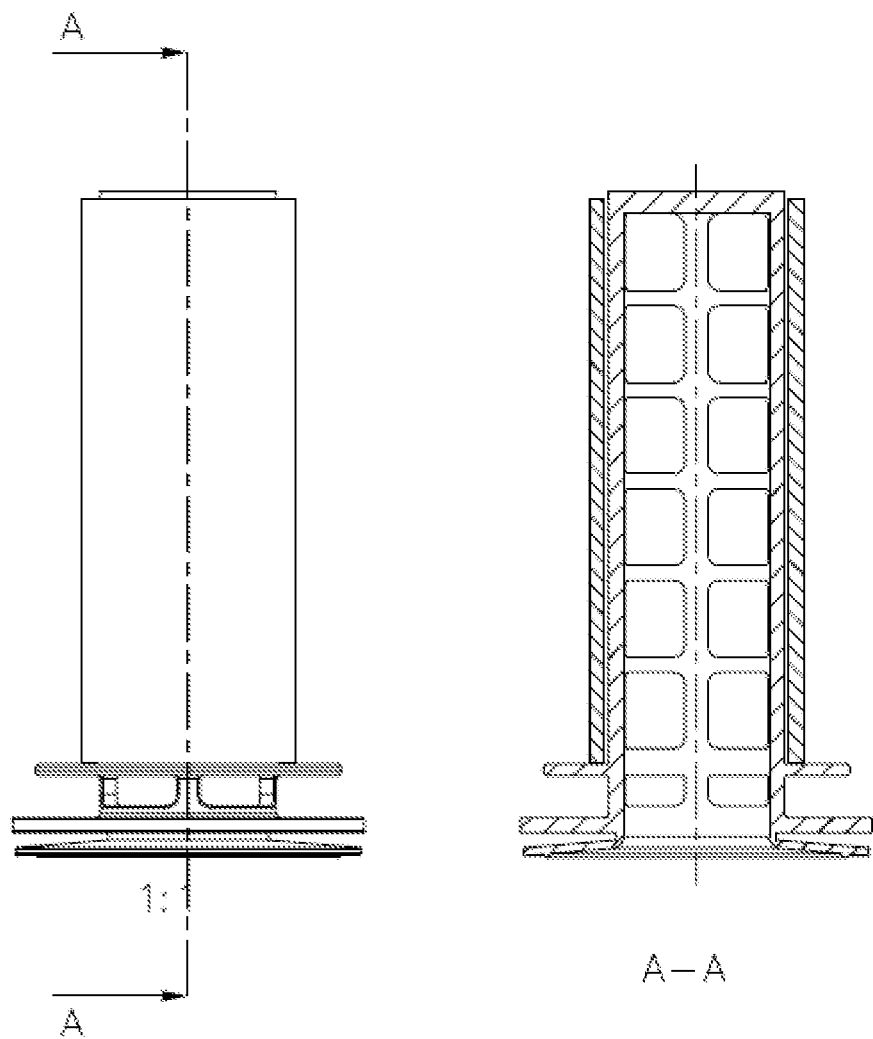
FIG. 9 is a sectional view depicting one variation of the filter in cross-section.

FIG. 9 shows cross section of said filter or graduated filter (9) showing possible constructional feature with a core around which filter material is wound therefore forming inner filter per specifications of this invention.

The invention claimed is:

1. A filter system configured to remove impurities including textile particles and microfibers released from textiles being processed in a fluid, wherein said filter system includes a filter housing having a fluid inlet and a fluid exit, said filter housing also including an entryway for placing and removing a filter cartridge in said filter housing;
    said filter cartridge comprising:
        a) a removable cartridge housing with at least one wall being permeable to said fluid;
        b) at least one first filter membrane constituting at least a portion of said at least one wall of said cartridge housing;
        c) a cartridge input port with said fluid inlet of said filter housing to direct said fluid to said removable cartridge housing; and,
        d) at least one movable inner filter, removably arranged within said interior of said removable cartridge housing and positioned to receive said fluid coming into said cartridge input port and be moved by said fluid, wherein said fluid passes said at least one movable inner filter reaching said filter membrane on said removable cartridge housing; wherein said at least one movable inner filter comprising a plurality of freely movable surfaces selected from a group consisting of bands, ribbons, tapes, floccules, strings, sheets, crumpled sheets and disks, said freely movable surfaces arranged to brush against said at least one wall thereby operating to remove and retain said impurities from said at least one wall.

2. The filter system of claim 1, wherein said filter housing is an integral part of a textile processing device.

3. The filter system of claim 2, wherein said textile processing device comprises a clothes washer and said fluid comprises water.

4. A filter system according to claim 1, wherein said fluid is selected from a group consisting of water, industrial oil, engine oil, cooking oil, air, oxygen, nitrogen, and nitrous oxide.

5. A filter system according to claim 1, wherein said at least one movable inner filter is electrically charged.

6. A filter system according to claim 1, wherein said at least one moveable inner filter is chosen from a group consisting of a graduated filter, a structurally stable filter, and bulk filter material.

7. A filter system according to claim 6, wherein said at least one movable inner filter includes a graduated filter comprising at least one filter layer, wherein said at least one filter layer is composed of at least one material chosen from a group consisting of polyamide, polyethylene, polypropylene, polyester, polyaramid, polyacrylonitrile, PTFE, quartz fibers, glass microfibers, mineral wool, glass wool, wood, paper, cotton, wool, and linen.

8. A filter system according to claim 7, wherein said at least one moveable inner filter is comprised of said freely movable surfaces having at least one edge where the edge has a shape selected from a group consisting of a zig zag shape, a wavy shape, fringes, slots, gaps, and indentations.

* * * * *